United States Patent
Srinivasan

(10) Patent No.: US 7,309,512 B2
(45) Date of Patent: Dec. 18, 2007

(54) METHOD OF REPAIRING AN ARTICLE HAVING A BONDCOAT AND A TOPCOAT

(75) Inventor: Vasudevan Srinivasan, Decatur, GA (US)

(73) Assignee: Siemens Power Generation, Inc., Orlando, FL (US)

( * ) Notice: Subject to any disclaimer, the term of this patent is extended or adjusted under 35 U.S.C. 154(b) by 0 days.

(21) Appl. No.: 11/397,365

(22) Filed: Apr. 4, 2006

(65) Prior Publication Data

US 2007/0231474 A1 Oct. 4, 2007

(51) Int. Cl.
*B32B 43/00* (2006.01)
*B05D 1/38* (2006.01)

(52) U.S. Cl. ...................... 427/140; 427/258; 427/270; 427/272; 427/282

(58) Field of Classification Search ................. 427/140, 427/258, 264, 270, 271, 272, 282
See application file for complete search history.

(56) References Cited

U.S. PATENT DOCUMENTS 6,235,352 B1 * 5/2001 Leverant et al. ............ 427/454
6,637,643 B2 * 10/2003 Hasz et al. ................. 228/119

* cited by examiner

*Primary Examiner*—William Phillip Fletcher, III

(57) ABSTRACT

A method for locally repairing a coated article having a bondcoat and a topcoat by removing a first portion of the topcoat and a second portion of the bondcoat and adding a new bondcoat and topcoat material such that the new topcoat material overlies the new bondcoat material and a rim of remnant bondcoat material is provided.

15 Claims, 2 Drawing Sheets

METHOD OF REPAIRING AN ARTICLE HAVING A BONDCOAT AND A TOPCOAT

BACKGROUND OF THE INVENTION

1. Field of the Invention

The present invention provides a method for locally repairing dislodged, damaged or otherwise unacceptable coatings on coated articles. Specifically, the present invention relates to a method for repairing coated articles having an upper thermal barrier coated layer and a lower bondcoat layer, wherein a series of masking allows the local removal and replacement of the layers of the coating article with minimal cost and speed.

2. Description of the Prior Art

Certain components or articles, such as turbine engines, are subjected to significant temperature and pressure extremes and degradation by oxidation and corrosives. For example, in airplane gas turbine engines, the temperature of the combustion of gases may exceed 3000° F., higher than the melting points of many of the engine parts. To protect the article subjected to these extremes, it is a common practice to coat the article with a topcoat, typically a thermal barrier ceramic coatings (TBC). The TBC protects the article from these extremes while also affording the opportunity to improve the efficiency of the engine by allowing the increase in operating temperatures.

For full effectiveness of the articles efficiency, the TBC must be strongly adhered to the coated article. The articles generally use an adhesive metallic bondcoat for this purpose, deposited on the surface of the article. The metallic bondcoat is typically a diffusion aluminide or an oxidation-resistant alloy, which promotes the adhesion of the insulating TBC layer to the component while also inhibiting oxidation of the underlying article.

Despite the coatings, flaws may occur in the coated article or in the coatings themselves. Often local coating repair is necessitated by detection of base metal or bondcoat cracking due to low cycle fatigue (LCF) or thermal-mechanical fatigue (TMF) in service-run parts. In the instance that the coated article has a defective area and requires repair, the remnant bondcoat and TBC have to be removed to have access to the defective area, after which the defective area is repaired and bondcoat and TBC is reapplied. In the prior art, there is no preferred mode to address this situation. Typically, a substantial amount of the coated article is stripped and recoated, which forces removal of not only defective coatings but also extensive amounts of acceptable coatings. Prior art has taught local repair of topcoats, but typically only removal of a portion of TBC is required. See, for example, U.S. Pat. No. 6,235,352 to Leverant et al.

There is a need for a reliable and reproducible manufacturing method for local repair of defective coatings and/or partially or fully lost coatings in service or to repair cracked/defective coated articles. This need is extensive due to the high cost and relatively long turn around time associated with the current practice, which forces stripping and recoating not only of local defective coatings but of expensive, acceptable coatings as well. There is a need for a method for local repair of coating that is locally applied to defective areas.

SUMMARY OF THEE INVENTION

The present invention has met the above described need by providing a method of locally repairing coated articles at specific defective areas.

It is an object of the present invention to provide a method for locally repairing a coated article having a bondcoat and a topcoat, wherein there is a defect in the coatings on the coated article or in the coated article itself, by removing a portion of the topcoat and a portion of the bondcoat and replacing the removed coatings with new bondcoat and topcoat material such that the new topcoat material overlies the new bondcoat material and a rim of remnant bondcoat material, thereby providing improved adhesion between the topcoat and the bondcoat, improved resistance of separation of the new topcoat material from the remnant topcoat material, and improved resistance of flaking of the topcoat material.

It is a further object of the invention to provide a method of repairing a coated article with an area to be repaired having a bondcoat and a topcoat, having the steps of outlining a first area on the topcoat, removing the topcoat within the first area and thereby creating a first opening in the topcoat, outlining a second area on the bondcoat beneath the first opening, wherein the second area is smaller than the first area, removing the bondcoat within the second area and thereby creating a second opening, the second opening surrounded by a rim such that both the rim and the second opening are beneath the first opening, adding new bondcoat material within the second opening, and adding new topcoat material within the first opening, the new topcoat material covering the new bondcoat material and the rim.

It is a further object of the invention to provide a method wherein the first area on the topcoat is about 15-30% larger than the area to be repaired and the second area on the bondcoat is about 5-20% larger than the area to be repaired and the first area larger than the second area.

It is a further object of the invention to provide a method to locally repair defects on the topcoat or the bondcoat and/or the coated article.

It is a further object of the invention to provide a method to locally repair coated articles that are subjected to harsh thermal cycles such as turbine engines, combustors and augmenter components.

It is a further object of the invention to provide a method to locally repair a coated article coated by a bondcoat and a topcoat, wherein the topcoat is a thermal barrier ceramic.

These and other objects of the invention will be more fully understood from the following description of the invention on reference to the illustrations appended hereto.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1A:
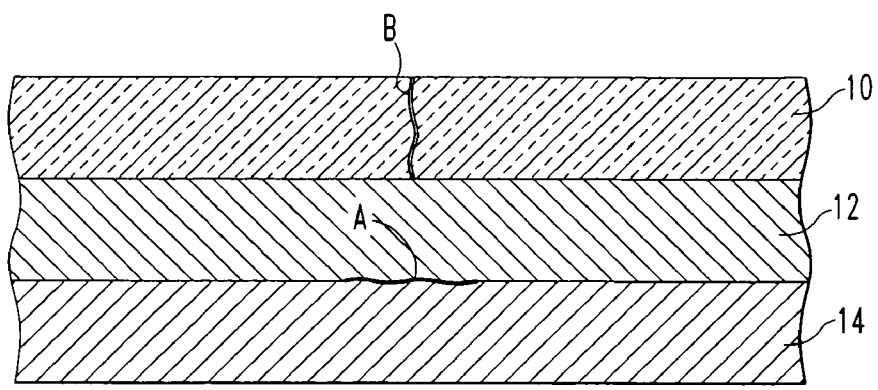
FIG. 1a is a side view of a coated article having a defective topcoat and a defective bondcoat.

As used herein, the terms "topcoat", "TBC" and "bondcoat" each refer to one or a multiplicity of layers. It is to be understood that some coated articles are coated with multilayer topcoats and multilayer bondcoats, of same or differing compositions. The invention will function with either a single layer or multilayer of each.

As used herein, the term "defect" and its variants can be a crack, flake, or any flaw that can be corrected, and further refers to defects in a coated article or in the coatings on the coated article.

For purposes of the description hereinafter, the terms "above", "beneath", "upper", "lower", "vertical", "horizontal", "top", "bottom", "aft", "behind", and derivatives thereof shall relate to the invention, as it is oriented in the drawing FIGS. However, it is to be understood that the invention may assume various alternative configurations except where expressly specified to the contrary. It is also to be understood that the specific elements illustrated in the drawings and described in the following specification are simply exemplary embodiments of the invention. Therefore, specific dimensions, orientations and other physical characteristics related to the embodiments disclosed herein are not to be considered limiting. For example, while the specific embodiments of the method disclose a topcoat above a bondcoat, which in turn is above a coated article, the method equally functions in the inverse, wherein the top coat is below a bondcoat, which in turn is below a coated article.

As shown in FIG. 1a, a typical coated article is depicted in a damaged state. The coated article can be any article having a bondcoat and a topcoat. Topcoat 10 is preferably a thermal barrier ceramic (hereinafter "TBC"), although the method is not limited to TBC topcoats. The TBC can be any substance known in the art as a thermal barrier ceramic, including, but not limited to, an yttria-stabilized zirconia (YSZ). Other types of TBC compounds may be used, however, within the method of the invention.

For the topcoat to protect an article throughout one or a multiplicity of heating and cooling cycles, it must be firmly adhered in place. To promote adhesion and extend the service life of the topcoat 10 on a coated article, oxidation-resistant bondcoat 12 is utilized. The composition of bondcoat 12 is preferably MCrAlY, wherein M is iron, cobalt and/or nickel, Cr is chromium, Al is aluminum, and Y is yttrium. However, the bondcoat can be any type of bondcoats known in the art for adhering a TBC to an article. For example, yttrium can be replaced by another rare earth element, such as Pt, Rh, Pd, Cr, Si, Hf or Zr.

Bondcoat 12 adheres to coated article 14. Coated article 14 can be any type of coated article known in the art that uses a topcoat, preferably a TBC, and a bondcoat. These are typically articles that deal with harsh thermal cycles, such as turbines, combustors and augmenter components, e.g. turbine blades. It is to be understood that the invention is not limited to these types of articles. Any article that can hold a bondcoat and topcoat would be suitable for the method of this invention.

Often due to the harsh thermal cycles and increased pressures that occur in and around coated article 14, cracks or other defects can form in topcoat 10, bond coat 12 or coated article 14. As shown in FIG. 1a, crack A has formed in coated article 14 just below bondcoat 12, and crack B has formed in the TBC.

To gain access to crack A in the bondcoat and cure crack B, a section of the TBC must be removed. A central area of the topcoat to be removed is outlined. Preferably, the area to be outlined is about 15-30% larger than the area of the defect, more preferably 20-25% larger than the area of the defect. That said, the exact percentage of the greater size of the area outlined vs. the area of the defect can vary widely with the skill of the user and the amount of topcoat the user is willing to sacrifice, typically between about 10-50%. In a preferred embodiment of the invention, the outlining of the central area is performed with a masking material. The masking material (hereinafter "masking") is preferably first used to cover the areas of the topcoat not requiring repair, the masking defining the central area within the masking to expose a portion of the topcoat elected for repair or above a section of bondcoat or articles that requires repair. Any type of masking materials known in the art can be used, most preferably a tape-like material.

The central area defined by the masking is removed completely by a means known in the art, wherein the central area includes the entire thickness of the topcoat within the central area. Typical removal techniques include grit blasting using optimized parameters such as grit size, pressure, grit feeding rate, nozzle geometry, impingement angle and blast-off distance. These techniques can be optimized by one skilled in the art to remove the topcoat (or bondcoat) effectively without damaging surrounding marks.

The grit blasting is continued until the central area is substantially fully removed. Removal of topcoat can be determined by the change in the surface appearance from typical service-exposed topcoat discoloration to a dull metallic appearance. After the TBC layer is removed, the masking is preferably removed. If necessary, remaining topcoat particulate matter is preferably removed with a compressed air hose or other like apparatus.

Figure 1B:
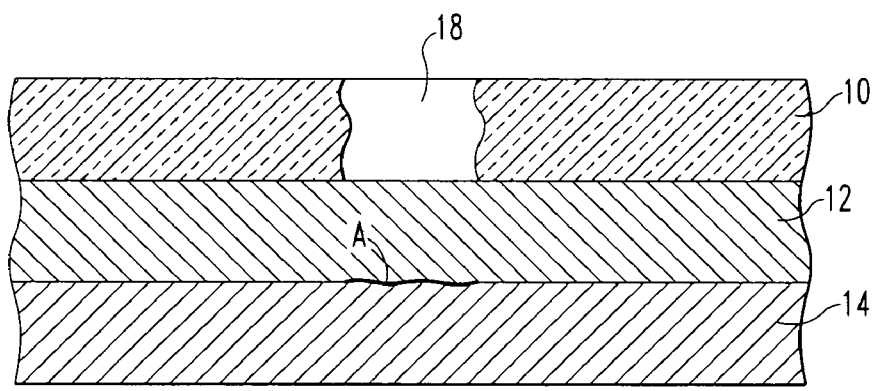
FIG. 1b is a side view of a coated article having a topcoat and a defective bondcoat, wherein a portion of the topcoat has been removed.

The resultant coated article is shown in FIG. 1b. The central area, after removal of the topcoat, has become opening 18, wherein opening 18 extends through the topcoat layer down to the bondcoat. As can be seen, crack B has been removed but crack A is still unreachable.

The area of the bondcoat that must be replaced to necessitate curing of crack A is then removed. A lower central area is outlined within the opening 18 on the surface of bondcoat 12, the lower central area smaller in area than the central area defined by the outline on the topcoat. This area can also vary with the skill level of the user, typically between about 1-25%, more preferably between about 10-20% The lower central area represents an area in which the bondcoat is to be removed, and includes the entire thickness of the bondcoat within the lower central area.

The area of the bondcoat that is replaced is also larger that the area to be repaired, most preferably between about 5-20% of the area of the defect, although this range can vary widely based on user skill and amount of topcoat one is willing to sacrifice.

In a preferred embodiment of the invention, the lower central area is outlined by a new masking applied within the opening 18 on the surface of bondcoat 12. The masking defines a lower central area on the bondcoat smaller than the central area. The masking surrounds the central area such that the masking is inward on all sides of opening 18. The area below central opening 18 consists of two parts: the bondcoat included in the lower central area, and the bondcoat that is covered by the masking. In additional embodiments, if applicable, additional bondcoat may be outward the masking but still below the central area. Once the second central area is removed, the bondcoat covered by the masking and any bondcoat outward the masking becomes rim 16.

The bondcoat within the lower central area is removed. Removal can be done by any means known in the art, such as the grit blasting followed by compressed air hose technique used to remove the topcoat. The masking on the bondcoat is preferably not removed at this time and remains in place above rim 16. However, in alternate embodiments, the masking on the bondcoat is removed.

Figure 1C:
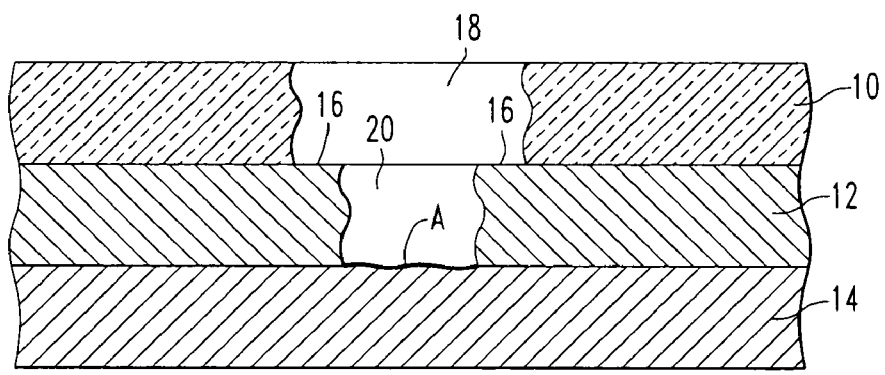
FIG. 1c is a side view of a coated article having a topcoat and a bondcoat, wherein a portion of the topcoat and the bondcoat has been removed such that a rim surrounds an opening where the bondcoat was removed.

As shown in FIG. 1c, after the removal of the desired bondcoat area, opening 20 is formed where the bondcoat within the lower central area once was. Opening 20 extends downward from the lower part of opening 18 to coated article 14. Rim 16 surrounds a top area of opening 20 beneath opening 18. Rim 16 is formed by the masking on the bondcoat and has a smaller area in size than the masking originally on the topcoat. At this point, any cracks in the bondcoat have been removed, and crack B on the coated article can be accessed and cured.

Figure 2:
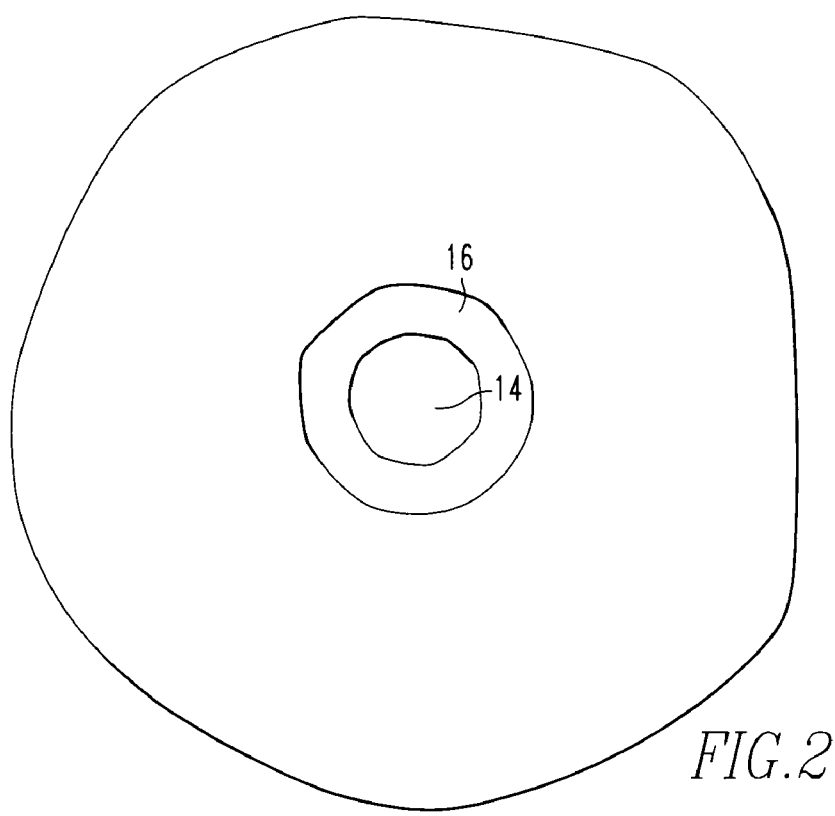
FIG. 2 is a top view of a of a coated article having a topcoat and a bondcoat, wherein a portion of the topcoat and the bondcoat has been removed such that a rim surrounds an opening where the bondcoat was removed.

As shown in FIG. 2, rim 16 does not have to have a uniform thickness as it surrounds the uncovered coated article. FIG. 2 shows a top view of rim 16 surrounding exposed coated article 14. As seen, the actual thickness of rim 16 can vary widely along the circumference of the rim while still maintaining the spirit of the invention. Further, the remnant bond coat may be distinguished from the coated article in that the remnant bondcoat is typically dull and the coated article is typically shiny if, for example, the coated article is a base metal alloy such as nickel.

Upon cleaning opening 20 of remaining particulate matter or other debris by a means known in the art, new bondcoat is applied within the space occupied by opening 20 to replace the removed bondcoat. If the masking on the rim had been removed or if no masking had originally been used, a new masking is preferably added that covers rim 16 prior to applying the replacement bondcoat. After preferably achieving a thickness of replacement bondcoat that substantially matches the remainder of the bondcoat, the masking on the topcoat is removed.

New topcoat material is applied within opening 18 to replace the topcoat material earlier removed, as known in the art. The topcoat material is preferably the same as the material of the removed topcoat, but this is not required. The new topcoat is located above the new bondcoat and above the remnant bondcoat of rim 16. The addition of the topcoat to the combination of remnant bondcoat and the new bondcoat improves adhesion of the topcoat to the bondcoat more than if the remnant bondcoat of rim 16 was not present. Further, inter-diffusion between the replacement bondcoat and the remnant bondcoat improves bonding and resistance to popping off or flaking by the topcoat. Additionally, due to the inclusion of rim 16, there is improved resistance between separation of the newly added topcoat and the surrounding, remnant topcoat. In preferred embodiments, a final masking is placed on top of topcoat 10 surrounding opening 18 prior to adding new topcoat material.

Figure 3:
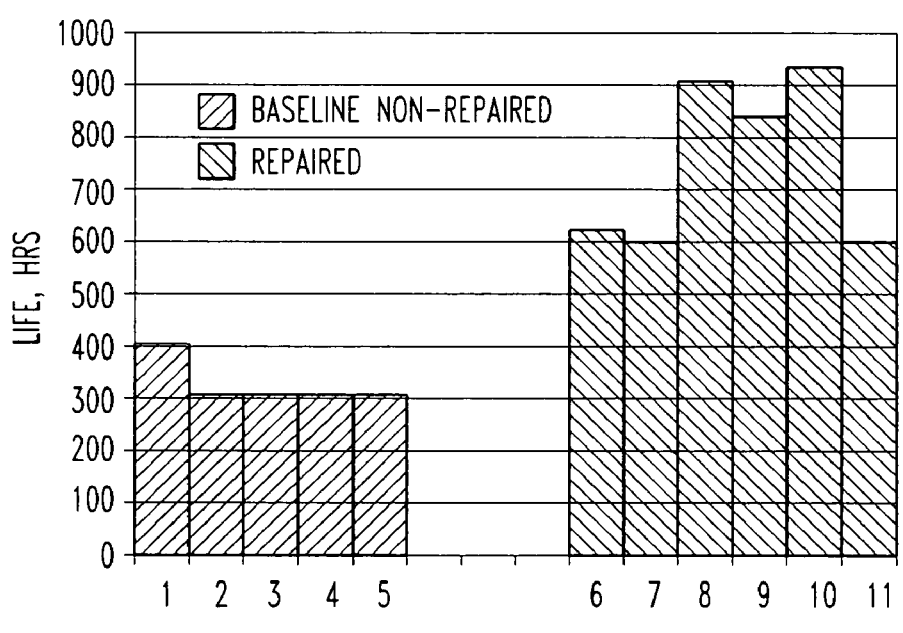
FIG. 3 is a chart comparing thermal cycle furnace life of repaired and non repaired coated articles.

Comparisons of articles repaired under the present invention to articles repaired with standard practice are shown in FIG. 3. Eleven article samples were exposed to a thermal cycle test to test the life span of articles repaired with known existing methods (samples 1-5) or with the method of the present invention (samples 6-11). The thermal cycle test included exposing each test sample to temperatures of approximately 2050° F. for approximately 23 hours in a conventional laboratory temperature controlled furnace and then cooling the test sample to room temperature for about one hour. The thermal cycle was repeated until the test sample displayed failure criterion. Failure criterion included an area of TBC spallation, a significant crack on the TBC, or other like damage.

Each of the samples tested in FIG. 3 had approximate dimensions of 3 inches×3 inches×0.19 inches with an average TBC thickness of about 290-310 micrometers. Samples 1-5 did not go through the local repair process of the present invention. Samples 6-11 were locally repaired in accordance with the present invention by first removing a localized portion of the TBC between about 8 and 12 milliliters in area and a localized section of the bondcoat beneath the removed TBC of about 6 to 10 milliliters in area.

As shown in FIG. 3, samples 6-11 each have a lifespan between about 600 and 925 hours. In contrast, samples 1-5 each have a considerably shorter lifespan, between about 300 and 410 life hours. This demonstrates that the articles repaired with the above localized repair process could have lives longer than or at the worst equal to the lives of non-repaired as coated articles.

The process of the invention is readily transferable to coated articles that have three or more coating layers. For example, coated articles may have at least two topcoat layers, one sequentially on top of the others. In this circumstance, the method of the invention is repeated such that the area outlined for removal on any topcoat layer is larger than the area outlined for removal on the topcoat layer immediately lower down to a lowest topcoat layer, which in turn is larger than an outline for removal on the bondcoat.

Whereas particular embodiments of the invention have been described herein for purposes of illustration, it will be evident to those skilled in the art that numerous variations of the details may be made without departing from the invention as defined in the appended claims.

The invention claimed is:

1. A method of repairing a coated article having a bondcoat and a topcoat comprising the steps of:
   outlining a first area on the topcoat,
   removing substantially an entire thickness of the topcoat within the first area, thereby creating a first opening in the topcoat and revealing at least a portion of the bondcoat beneath the topcoat,
   outlining a second area on the bondcoat, within the first opening, the second area smaller than the first area,
   removing substantially an entire thickness of the bondcoat within the second area, thereby creating a second opening in the bondcoat, the second opening surrounded by a rim such that both the rim and the second opening are beneath the first opening,
   adding new bondcoat material within the second opening, and
   adding new topcoat material within the first opening, the new topcoat material covering the new bondcoat material and the rim.

2. The method of claim 1, wherein the first area on the topcoat is about 15-50% larger than a defective area to be repaired.

3. The method of claim 1, wherein the second area on the bondcoat is about 5-20% larger than a defective area to be repaired.

4. The method of claim 1, wherein the rim is protected when adding new bondcoat material within the second opening.

5. The method of claim 4, wherein the rim is protected with a masking.

6. The method of claim 1, further comprising the step of curing a defect in the coated article prior to adding new bondcoat material.

7. The method of claim 1, wherein the outlining of the first area is performed with a masking.

8. The method of claim 1, wherein the outlining of the second area is performed with a masking.

9. The method of claim 1, wherein the bondcoat composition is MCrAlY, wherein M is selected from the groups consisting of iron, nickel or cobalt.

10. The method of claim 1, wherein the topcoat is a thermal barrier ceramic.

11. The method of claim 10, wherein the thermal barrier ceramic is an yttria-stabilized zirconia.

12. The method of claim 1, wherein the coated article is a component of a turbine engine.

13. The method of claim 1, wherein the bondcoat is defective, and wherein the step of removing the bondcoat from the second area removes the defective bondcoat.

14. The method of claim 1, wherein the second area on the bondcoat is 1-25% smaller than the first area on the topcoat.

15. A method of repairing a coated article having a bondcoat and at least two topcoat layers comprising the steps of:
   a) outlining a first area on a top topcoat layer of the at least two topcoat layers,
   b) removing substantially an entire thickness of the top topcoat layer within the first area, thereby creating a first opening in the top topcoat layer and revealing at least a portion of a second topcoat layer of the at least two topcoat layers beneath the top topcoat layer,
   c) outlining a second area on the second topcoat layer, within the first opening, the second area smaller than the first area,
   d) removing substantially an entire thickness of the second topcoat layer within the second area, thereby creating a second opening in the second topcoat layer, the second opening surrounded by a rim such that both the rim and the second opening are beneath the first opening,
   e) repeating steps c) and d) for any additional topcoat layers of the at least two topcoat layers, down to a lowest topcoat layer
   f) outlining a bondcoat area on the bondcoat, within an opening in the lowest topcoat layer, the bondcoat area smaller than the opening in the lowest topcoat layer,
   g) removing substantially an entire thickness of the bondcoat within the bondcoat area, thereby creating a bondcoat opening in the bondcoat, the bondcoat opening surrounded by a rim such that both the rim and the bondcoat opening are beneath the opening of the lowest topcoat area,
   h) adding new bondcoat material within the bondcoat opening, and
   i) adding new topcoat material sequentially within each of the topcoat openings, the new topcoat material covering below new material and the rim surrounding the new material.

* * * * *